(12) United States Patent
Martin et al.

(10) Patent No.: US 11,716,785 B2
(45) Date of Patent: Aug. 1, 2023

(54) TERMINAL DEVICES, INFRASTRUCTURE EQUIPMENT AND METHODS

(71) Applicant: Convida Wireless, LLC, Wilmington, DE (US)

(72) Inventors: Brian Alexander Martin, Basingstoke (GB); Shin Horng Wong, Basingstoke (GB); Martin Warwick Beale, Basingstoke (GB); Hiromasa Uchiyama, Basingstoke (GB); Hideji Wakabayashi, Basingstoke (GB); Shinichiro Tsuda, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/496,972

(22) PCT Filed: Mar. 22, 2018

(86) PCT No.: PCT/EP2018/057366
§ 371 (c)(1),
(2) Date: Sep. 24, 2019

(87) PCT Pub. No.: WO2018/172485
PCT Pub. Date: Sep. 27, 2018

(65) Prior Publication Data
US 2021/0105863 A1     Apr. 8, 2021

(30) Foreign Application Priority Data
Mar. 24, 2017  (EP) .................................... 17162886

(51) Int. Cl.
*H04W 88/04*     (2009.01)
*H04W 76/14*     (2018.01)
(Continued)

(52) U.S. Cl.
CPC .......... *H04W 88/04* (2013.01); *H04W 24/10* (2013.01); *H04W 72/02* (2013.01);
(Continued)

(58) Field of Classification Search
CPC ..... H04W 88/04; H04W 24/10; H04W 72/02; H04W 72/0453; H04W 72/542; H04W 76/14
See application file for complete search history.

(56) References Cited

U.S. PATENT DOCUMENTS

| | | | |
|---|---|---|---|
| 2008/0089314 A1* | 4/2008 | Meyer | H04L 47/26 370/349 |
| 2010/0222007 A1* | 9/2010 | Rao | H04W 24/10 455/67.11 |

(Continued)

FOREIGN PATENT DOCUMENTS

| | | |
|---|---|---|
| CN | 105493433 A | 4/2016 |
| CN | 106464478 A | 2/2017 |

(Continued)

OTHER PUBLICATIONS

Harri Holma and Antti Toskala, "LTE for UMTS—OFDMA and SC-FDMA Based radio Access", John Wiley & Sons, Ltd., 8 pages.

(Continued)

*Primary Examiner* — Ayanah S George
(74) *Attorney, Agent, or Firm* — BakerHostetler (57) ABSTRACT

A terminal device for use with a wireless telecommunications system, the terminal device comprising: a transmitter; a receiver configured to receive a measurement radio signal from each of one or more potential relay nodes of the wireless telecommunications system, each measurement radio signal being transmitted using the same predetermined radio frequency band and identifying the one of the potential relay nodes from which it is transmitted; and a controller
(Continued)

configured: to measure a characteristic of each received measurement radio signal, and based on each received measurement radio signal and its measured characteristic, to determine a suitable one of the one or more potential relay nodes for acting as a relay node for relaying the further radio signal between the terminal device and the infrastructure equipment.

10 Claims, 6 Drawing Sheets

(51) Int. Cl.
*H04W 24/10* (2009.01)
*H04W 72/02* (2009.01)
*H04W 72/0453* (2023.01)
*H04W 72/542* (2023.01)

(52) U.S. Cl.
CPC ..... *H04W 72/0453* (2013.01); *H04W 72/542* (2023.01); *H04W 76/14* (2018.02)

(56) References Cited

U.S. PATENT DOCUMENTS

| | | | |
|---|---|---|---|
| 2014/0036760 A1 | 2/2014 | Rickard | |
| 2014/0308954 A1* | 10/2014 | Wang | H04W 36/165 455/436 |
| 2015/0002334 A1* | 1/2015 | Lim | G01S 5/10 342/357.47 |
| 2016/0270088 A1 | 9/2016 | Martin et al. | |
| 2017/0027009 A1* | 1/2017 | Dumpala | H04W 76/14 |
| 2018/0287761 A1* | 10/2018 | You | H04L 5/0053 |
| 2019/0239132 A1* | 8/2019 | Wallentin | H04W 36/0069 |

FOREIGN PATENT DOCUMENTS

| | | |
|---|---|---|
| CN | 106537813 A | 3/2017 |
| WO | 2016/099227 A1 | 6/2016 |
| WO | 2016/155990 A1 | 10/2016 |
| WO | 2017/026977 A1 | 2/2017 |
| WO | 2017/030520 A1 | 2/2017 |
| WO | WO-2017026977 A1 * | 2/2017 ........... H04B 17/309 |

OTHER PUBLICATIONS

International Search Report and Written Opinion dated Jun. 29, 2018 for PCT/EP2018/057366 filed on Mar. 22, 2018, 9 pages.
Intel, "Motivation for SI: Further LTE D2D Enhancements for Wearables and MTC", 3GPP TSG RAN Meeting No. 71 RP-160427, Göteborg, Sweden, Mar. 7-10, 2016, pp. 1-13.
LG Electronics, "Motivation for New SI Enhancements of relayed Connection via WLAN and LTE Sidelink (ECO)" RP-160241, pp. 1-5.
China Telecom, "Discussion on UE Relay for eMBB and IoT", 3GPP TSG RAN Meeting No. 71 RP-160247, Göteborg, Sweden, Mar. 7-10, 2016, pp. 1-6.
Qualcomm, "Motivation for SI proposal on Further Enhancements to LTE Device to Device", RP-160268, pp. 1-10.
ZTE, "Motivation for new Work Item on D2D communication for commercial use cases", 3GPP TSG RAN Meeting No. 71 RP-160283, Göteborg, Sweden, Mar. 7-10, 2016, 8 pages.
Huawei et al., "L2 UE-to-Network Relay for E-UTRAN", 3GPP TSG-RAN No. 71 RP-160415, Göteborg, Sweden, Mar. 7-10, 2016, pp. 1-4.
Huawei et al., "Revised SI: Further Enhancements LTE Device to Device, UE to Network Relays for IoT and Wearables", 3GPP TSG RAN Meeting No. 73 RP-161839 revision of RP-161802, New Orleans, Sep. 19-22, 2016, 8 pages.
Qualcomm Incorporated, "New Work Item: NarrowBand IOT (NB-IOT)"; 3GPP TSG RAN Meeting No. 69 RP-151621; Phoenix, USA, Sep. 14-16, 2015, 8 pages.
Qualcomm Incorporated et al., "New SI: Further Enhancements LTE Device to Device, UE to Network Relays for Wearables", 3GPP TSG RAN Meeting No. 71 RP-160677, Gothenburg, Sweden, Mar. 7-10, 2016, 7 pages.
ZTE, "Further discussion on the working scope of R14 feD2D," 3GPP TSG-RAN WG2 Meeting #94, R2-163839, May 23-27, 2016, pp. 5.

* cited by examiner

TERMINAL DEVICES, INFRASTRUCTURE EQUIPMENT AND METHODS

CROSS-REFERENCE TO RELATED APPLICATIONS

The present application is based on PCT filing PCT/EP2018/057366, filed Mar. 22, 2018, which claims priority to EP 17162886.0, filed Mar. 24, 2017, the entire contents of each are incorporated herein by reference.

BACKGROUND

Field of Disclosure

The present disclosure relates to terminal devices, infrastructure equipment and methods for use with a wireless telecommunications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices, together with MTC devices (for example) are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. These challenges are also expected to be applicable to new generation wireless telecommunications systems, such as those implementing new Radio Access Technologies (RATs) such as 5th generation (5G) or NR (New Radio).

SUMMARY OF THE DISCLOSURE

The present disclosure can help address or mitigate at least some of the issues discussed above.

Respective aspects and features of the present disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Communications System and Relay Nodes

Figure 1:
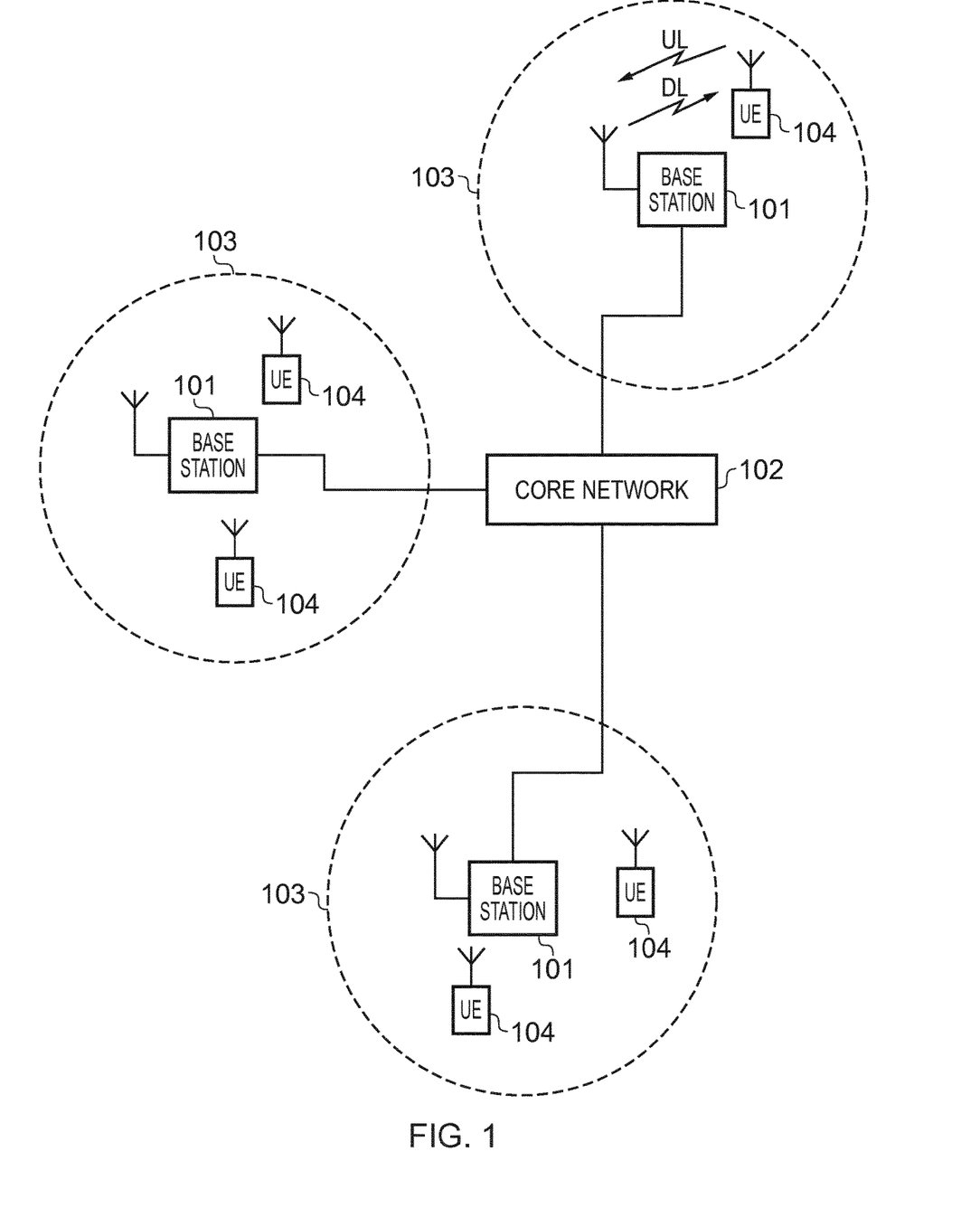
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink (DL). Data is transmitted from communications devices 104 to the base stations 101 via a radio uplink (UL). The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, terminal devices, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include communication devices configured to act as relay nodes, for example to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced even when the terminal is within the network coverage, as the range of transmission for that terminal will be reduced. Other benefits of using devices as relay nodes include better network resource utilisation, because a short device to device communication range means that resources can be re-used in different regions of a cell, a shorter range potentially means less retransmissions or repetitions of data, and because a shorter range means less interference due to a lower transmit power. Communication devices configured to act as relay nodes may also reduce signalling overhead, because for example mobility related signalling procedures may be performed by the relay node on behalf of remote UEs connected to the relay, rather than being performed by each individual device. The relay node functionality allows a remote device to be identifiable and addressable by the mobile network operator, allows operator control of quality of service, and provides end-to-end security, providing advantages over traditional tethering which is already possible for example by use of Bluetooth.

Figure 2:
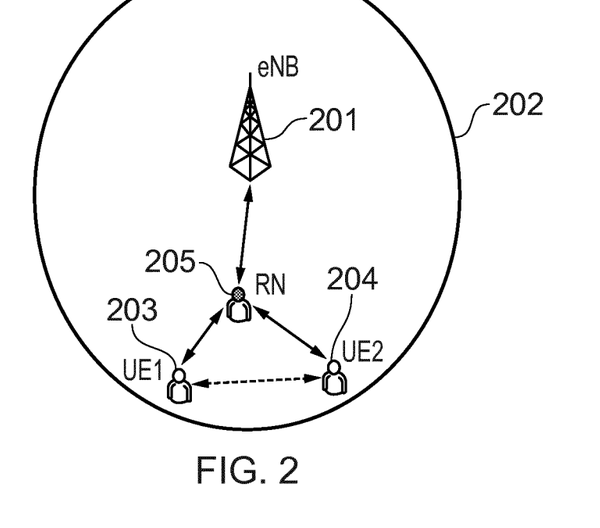
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a communications device configured to act as a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

Relay technologies (such as a communication device configured to act as a relay) are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers 2. 'Guard band operation' utilising the unused resource blocks within a LTE carrier's guard-band 3. 'In-band operation' utilising resource blocks within a normal LTE carrier One of the objectives of NB-IoT is to allow the cost of devices to be as low as possible. This is also an objective of Machine Type Communication (MTC) such as Low Complexity Machine Type Communication (LC-MTC). LC-MTC terminal devices (UEs) also implement new LTE features which are currently being specified in 3GPP. The main features of LC-MTC UE are low complexity (and therefore low cost), reduced bandwidth, coverage enhancement and reduced power consumption.

Wearable devices (such as smartwatches and the like) are examples of devices which may make use of NB-IoT or LC-MTC communications systems. In 3GPP Rel. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay. Another possibility would be to use Bluetooth or Wi-Fi for the relay link (sidelink).

Figure 3:
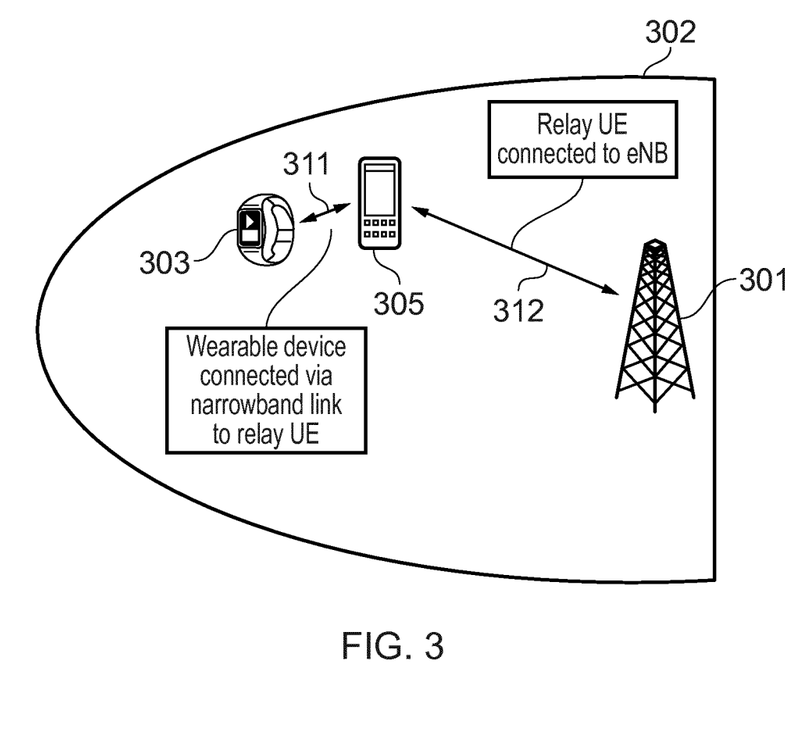
FIG. 3 illustrates an example scenario in which a remote wearable device may communicate with an eNodeB using a communications device as a relay node.

FIG. 3 illustrates an example scenario in which a remote device 303 (in this case, a remote wearable device 303) may communicate with an eNodeB 301 using a communications device 305 as a relay node. The eNodeB 301 has a coverage area 302, which the remote wearable device 303 and communications device 305 are within. The remote device 303 is connected by a narrowband link 311 to the communications device 305, and the communications device is connected by a conventional link 312 to the eNodeB 301. The remote device 303 may be, for example, a smartwatch, while the communications device 305 may be, for example a smartphone. The owner of the smartwatch may also own the smartphone, or alternatively, they may be owned by separate users.

As part of 3GPP study item for Rel-15 [4], some of the concepts used in MTC and NB-IOT will be introduced for the D2D sidelink. Included in this is introduction of a limited bandwidth, for example 6 PRBs (Physical Resource Blocks)/1.4 MHz bandwidth sidelink similar to MTC. A UE with a limited receiver bandwidth (e.g. supporting LTE Cat-M) will also support a limited bandwidth for sidelink, in addition to direct link with the eNB.

As such it is not possible for this type of UE to monitor Uu (direct link) and PC5 (sidelink) simultaneously using the same receiver. In addition it is not possible to monitor more than 6 PRBs (in this example) on sidelink simultaneously.

In order to establish a PC5 connection between a remote UE 311 (e.g. limited bandwidth wearable device) and a relay UE 305 (e.g. Cat.1+ smartphone) the UEs must first perform a selection procedure and establish the PC5 connection. According to the current relay operation in Rel-13, the remote UE performs measurements on D2DSS (Device to Device Synchronisation Signal) transmitted by one or more relays, and once the criterion is met (e.g. RSRP (Reference Signal Received Power) or RSRQ (Reference Signal Received Quality) is above a threshold) then a relay may be selected, and a PC5 connection can be established to perform D2D (Device to Device) communication.

A radio resource pool is provided to the remote UE 311 to perform reception of various D2D signals. D2DSS, D2D discovery, and D2D sidelink data and control radio resource pools are provided. Due to the limited bandwidth of the remote UE 311, an efficient method for performing measurement, sync, discovery and communication is necessary.

Figure 4:
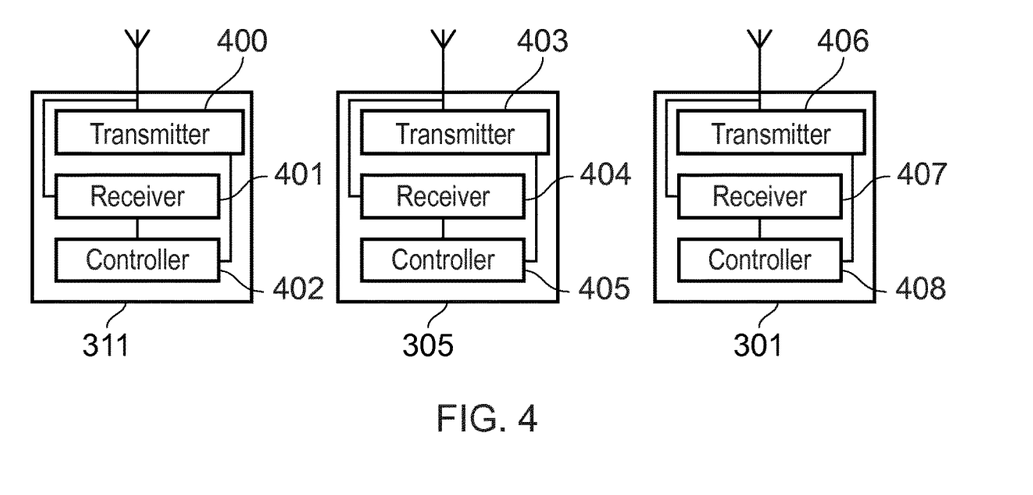
FIG. 4 illustrates an example remote device, relay device and infrastructure equipment.

The present disclosure provides a terminal device 311 (for use as a remote device) for use with a wireless telecommunications system. Some components of the terminal device 311 are shown in FIG. 4. The terminal device comprises a transmitter 400. The terminal device 311 comprises a receiver 401 configured to receive a measurement radio signal from each of one or more potential relay nodes 305 of the wireless telecommunications system, each measurement radio signal being transmitted using the same predetermined radio frequency band and identifying the one of the potential relay nodes from which it is transmitted. The terminal device 311 comprises a controller 402. The controller is configured to measure a characteristic of each received measurement radio signal indicative of the suitability of the potential relay node associated with that measurement radio signal for acting as a relay node for relaying a further radio signal between the terminal device 311 and infrastructure equipment 301 of the wireless telecommunications system. Based on each received measurement radio signal and its measured characteristic, the controller 402 determines a suitable one of the one or more potential relay nodes for acting as a relay node for relaying the further radio signal between the terminal device 311 and the infrastructure equipment 301.

The controller 402 controls one of the transmitter 400 to transmit the further radio signal to the infrastructure equipment 301 via the determined relay node and the receiver 401 to receive the further radio signal from the infrastructure equipment 301 via the determined relay node.

Thus, the terminal device 311 comprises a transmitter 400 for transmission of wireless signals, a receiver 401 for reception of wireless signals and a controller 402 configured to control the terminal device 311. The controller 402 may comprise various sub-units for providing functionality in accordance with embodiments of the present disclosure as explained further herein. These sub-units may be implemented as discrete hardware elements or as appropriately configured functions of the controller 402. Thus the controller 402 may comprise a processor which is suitably configured/programmed to provide the desired functionality described herein using conventional programming/configuration techniques for equipment in wireless telecommunications systems. The transmitter 400, receiver 401 and controller 402 are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 301 will in general comprise various other elements associated with its operating functionality, for example a power source, user interface, and so forth, but these are not shown in FIG. 4 in the interests of simplicity.

The present disclosure also provides a terminal device 305 for use as a relay node in a wireless telecommunications system. Some components of the terminal device 305 are shown in FIG. 4. The terminal device 305 comprises a transmitter 403 configured to transmit a measurement radio signal to a further terminal device 311 of the wireless telecommunications system configured to use the terminal device as a relay node for relaying a further radio signal between the further terminal device 311 and infrastructure equipment 301 of the wireless telecommunications system. The transmitted measurement radio signal identifies the terminal device 305, comprises a characteristic measurable by the further terminal device 311 and indicative of the suitability of the terminal device 305 for acting as a relay node for relaying a further radio signal between the further terminal device 311 and the infrastructure equipment 301, and is transmitted using the same predetermined radio frequency band as usable for transmission of a measurement radio signal by one or more further potential relay nodes 305 of the wireless telecommunications system. Each of these measurement radio signals identifies the one of the one or more further potential relay nodes 305 from which it is transmitted and comprises a characteristic measurable by the further terminal device 311 and indicative of the suitability of the one of the one or more further potential relay nodes 305 from which it is transmitted for acting as a relay node for relaying a further radio signal between the further terminal device 311 and the infrastructure equipment 305. The terminal device 305 also comprises a receiver 404 and a controller 405.

Thus, the terminal device 305 comprises a transmitter 403 for transmission of wireless signals, a receiver 404 for reception of wireless signals and a controller 405 configured to control the terminal device 305. The controller 405 may comprise various sub-units for providing functionality in accordance with embodiments of the present disclosure as explained further herein. These sub-units may be implemented as discrete hardware elements or as appropriately configured functions of the controller 405. Thus the controller 405 may comprise a processor which is suitably configured/programmed to provide the desired functionality described herein using conventional programming/configuration techniques for equipment in wireless telecommunications systems. The transmitter 403, receiver 404 and controller 405 are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 301 will in general comprise various other elements associated with its operating functionality, for example a power source, user interface, and so forth, but these are not shown in FIG. 4 in the interests of simplicity.

The present disclosure also provides infrastructure equipment 301 for use with a wireless telecommunications system comprising a first terminal device 311 (remote device) and one or more second terminal devices 305 (relay devices), the first terminal device being configured to receive a measurement radio signal from each of the one or more second terminal devices, each measurement radio signal being transmitted using the same predetermined radio frequency band and identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device. Some components of the infrastructure equipment are shown in FIG. 4. The infrastructure equipment comprises a transmitter 406, a receiver 407 and a controller 408. The transmitter 406 is configured to transmit a radio signal to the first terminal device comprising information indicative of the predetermined radio frequency band (for example, radio resources which define the predetermined radio frequency band).

Thus, the infrastructure equipment comprises a transmitter 406 for transmission of wireless signals, a receiver 407 for reception of wireless signals and a controller 408 configured to control the infrastructure equipment 301 to operate in accordance with embodiments of the present disclosure as described herein. The controller 408 may again comprise various sub-units, such as a scheduler, for providing functionality in accordance with embodiments of the present disclosure as explained further below. These sub-units may be implemented as discrete hardware elements or as appropriately configured functions of the controller 408. Thus, the controller 408 may comprise a processor which is suitably configured/programmed to provide the desired functionality described herein using conventional programming/configuration techniques for equipment in wireless telecommunications systems. The transmitter 406, receiver 407 and controller 408 are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment will in general comprise various other elements associated with its operating functionality, such as a scheduler. For example, although not shown in FIG. 4 for simplicity, the controller 408 may comprise a scheduler, that is to say the controller 408 may provide the scheduling function for the infrastructure equipment.

In an embodiment, the predetermined radio frequency band in which a measurement radio signal is transmitted by each of a plurality of potential relay nodes may be an anchor carrier. The concept of an anchor carrier is known from NB-IoT, for example. In an embodiment, this concept is adapted for use in D2D selection and communication.

In an embodiment, the measurement signal transmitted by each potential relay node 305 is a D2DSS (Device to Device Synchronisation signal) or SLSS (Sidelink Synchronisation Signal). A D2DSS is transmitted from multiple relays within the same common narrowband PRBs (e.g. 6 PRBs) in order for the remote UE 311 to perform an efficient measurement and synchronisation procedure. In this case, the predetermined radio frequency band may be, for example, a predetermined narrowband with a bandwidth defined by that of a predetermined number of physical resource blocks (PRBs) (e.g. six PRBs) adjacent to each other in the frequency domain. Further discovery and communication data can be provided in other narrowbands once the UE 311 has performed the initial selection and synchronisation. That is, a further radio signal (for discovery or communication purposes, for example) transmitted to or received from the infrastructure equipment 301 via the determined relay node 305 is transmitted to or received from the determined relay node 305 using a radio frequency band associated with the determined relay node, each of the plurality of potential relay nodes being associated with a respective radio frequency band for transmission of the further radio signal. Each respective radio frequency band may be different (that is, non-overlapping). Alternatively, one or more of the respective radio frequency bands may overlap or may be shared by one or more of the potential relay nodes 305. The potential relay node and radio frequency band association may be implemented using a predetermined association between the received D2DSS or SLSS transmitted by the selected relay node 305 (the D2DSS or SLSS comprising an identifier of the UE 305 from which it is transmitted) and respective discovery and/or communication resources of an appropriate narrowband, for example. In these examples, if the predetermined radio frequency band is a predetermined narrowband, then the receiver 401 of the remote UE 311 may be configured to receive radio signals transmitted over a bandwidth no greater than that of the predetermined radio frequency band (this may be the case for an MTC or NB-IoT remote UE 311, for example, wherein the receiver 401 is only able to receive radio signals using a narrowband which is 6 PRBs wide in the frequency domain).

Figure 5:
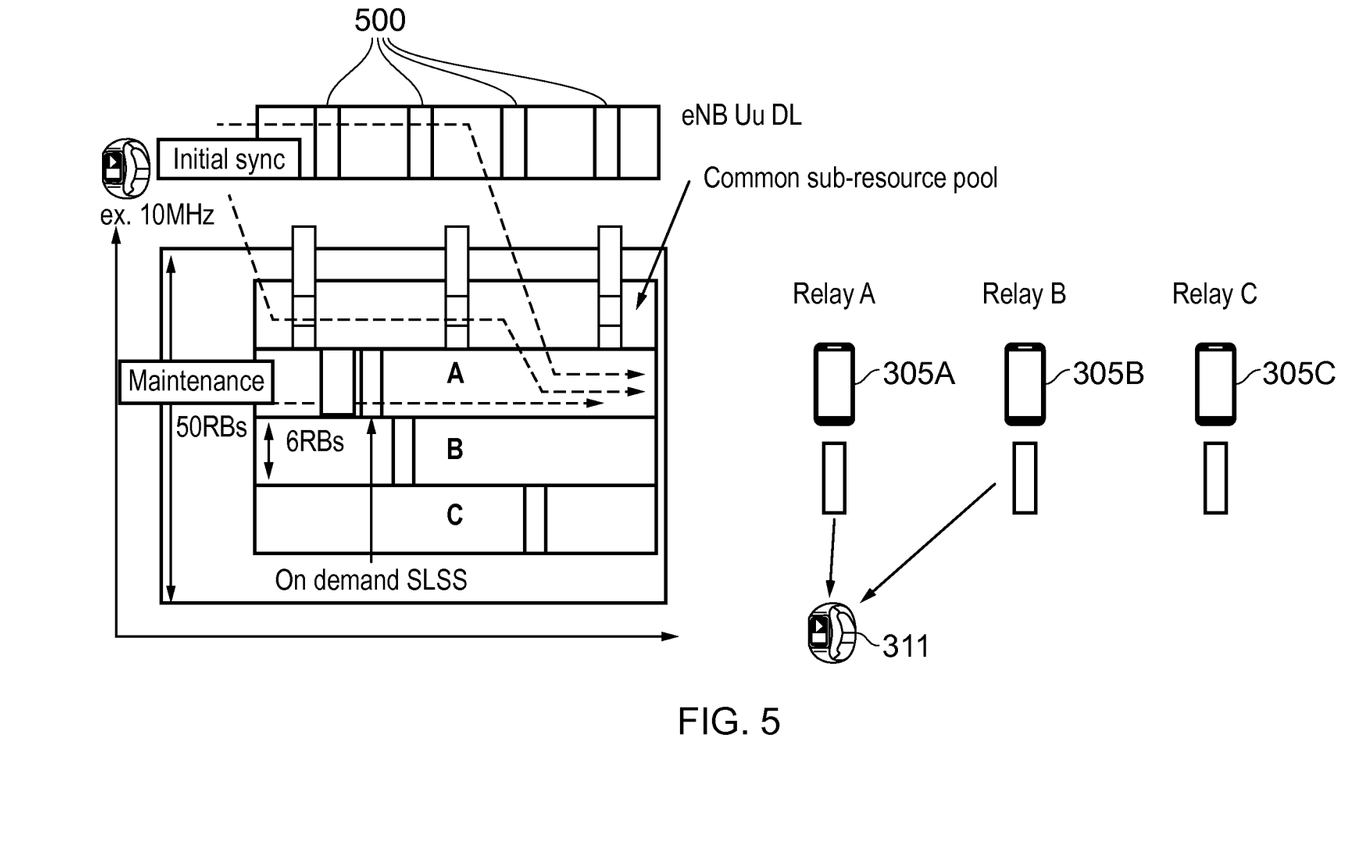
FIG. 5 illustrates an example of a common resource pool and a plurality of relay-specific resource pools.

FIG. 5 illustrates one potential arrangement of resources to support efficient relay selection and synchronisation for bandwidth limited (BL) remote UEs (such as MTC or NB-IoT remote UEs, as mentioned above). In the above example, there are 3 potential relay devices 305A, 305B and 305C (which may be referred to as "Relay A", "Relay B" and "Relay C", respectively) that the remote UE 311 may connect to. In order to determine the most suitable relay, the remote UE performs measurements of the reference signal received power (RSRP) or reference signal received quality (RSRQ) of the measurement radio signal (such as a D2DSS or SLSS) from each of the relay devices in order to determine the one with the best received signal. In this case, the RSRP or RSRQ are examples of characteristics of the D2DSS or SLSS which are indicative of the suitability of each device 305A, 305B and 305C for acting as a relay node for the remote device 311.

For Rel-13, a remote device needs to be capable (that is, using 2 receivers) to perform communication with both the eNB 301 and relay node 305 (via sidelink) simultaneously. In addition, a D2D UE in coverage of an eNB needs to maintain synchronisation using the PSS (Primary Synchronisation Signal)/SSS (Secondary Synchronisation Signal) transmitted from the eNB. A reason to introduce a bandwidth limitation for sidelink is to reduce the hardware cost and form factor size as well as reduce power consumption of the device 311 (this is useful for devices 311 such as wearable devices such as smartwatches, bands and so on, for example). It is thus desirable and required to support remote devices with only 1 receiver (rather than 2 receivers) as well as that 1 receiver being bandwidth reduced.

For a UE 311 connected/camped on an eNB 301, first of all there needs to be measurement opportunities (e.g. during DRX (Discontinuous Reception) in idle mode, or during measurement gaps in connected mode) to re-tune the receiver 401 to the sidelink carrier frequency in order to perform measurements on potential relays. Such measurement opportunities 500 in the eNB Uu DL are schematically illustrated in FIG. 5. In general, the existence of the measurement opportunities 500 means that the receiver 401 of the remote UE 311 may receive radio signals transmitted from the infrastructure equipment 301 using a different radio frequency band to the predetermined radio frequency band (within which the measurement radio signals are transmitted) and to periodically switch (during the measurement opportunities 500) to receiving radio signals transmitted using the predetermined radio frequency band.

In order to make most efficient use of the measurement opportunities, it is desirable for the remote UE to be able to detect and measure D2DSS from multiple relay UEs in the same subcarriers. Otherwise the UE has to retune to measure different carriers at different times, potentially limiting the number of different narrowbands that can be measured or increasing the measurement time for a given number of potential relays. For this reason, as previously mentioned, a common narrow band contains measurement radio signals (such as D2DSS or SLSS) for multiple potential relay UEs 305.

In an embodiment, the measurement radio signals transmitted from the plurality of potential relay nodes 305 are each transmitted at a different respective time. For example, the multiple measurement radio signals may be time-division multiplexed (TDM) within the common narrowband (for example transmitted intermittently and one after the other within a short time window corresponding to the relevant measurement opportunity 500).

In an embodiment, the measurement radio signals transmitted from the plurality of potential relay nodes are each encoded using a different respective code. For example, the multiple measurement radio signals (such as SLSS) could be code-division multiplexed (CDM) within the common narrowband, with each signal having a unique code or sequence (e.g. each signal could be based on a specific root Zadoff-Chu (ZC) sequence), or cyclic shift of a sequence (e.g. each signal could have a unique cyclic shift of a root ZC sequence), or combination of sequence and shift of that sequence (e.g. there could be one or more root ZC sequences and one or more cyclic shifts and the signal could be identified as a particular cyclic shift of a particular ZC sequence).

The sequences applied in this embodiment can be unused LTE sequences. Currently, REL-12 LTE identifies 0-355 SLSS IDs, which are associated with signals created from a combination of 2(PSSS)×168(SSSS). However, there are 62 potential PSSS ZC sequences, of which the SLSS IDs are only associated with the aforementioned 2 PSSS sequences (these sequences are identified as having parameters u=26 and u=37). One or more of the other 60 unused PSSS sequences can hence be used to create signals according to this embodiment. In an embodiment, characteristics of the sequences comprise at least one of symmetricity of centre (u and 63-u), low peak to average ratio (PAPR), low auto correlation of own signal, low cross correlation of REL-8 PSS (root index u=25, 29, 34 are used in REL-8 PSS, these sequences should be avoided) and high PSSS detection probability at any carrier frequency. For example, new sequences can be assigned with parameter u=16 for a relay UE that is synchronised to an eNodeB and u=47 for a relay UE that is out of coverage.

In an embodiment, the measurement radio signals transmitted from the plurality of potential relay nodes are each transmitted using a different respective frequency sub-band of the predetermined radio frequency band. For example, frequency division multiplexing could be used, wherein each measurement radio signal (such as SLSS) is transmitted using 1 PRB (thus allowing up to 6 measurement radio signals to be transmitted simultaneously using a 6 PRB wide common narrowband).

Once the UE 311 has performed measurement of the one or more measurement radio signals and the selection criterion has been met (for example, if SLSS or D2DSS RSRP or RSRQ is above a predetermined threshold), then the UE 311 can proceed to perform a discovery procedure or indirect communication to the network via the selected relay 305 (the UE 311 establishing a PC5 connection with the UE 305, for example). Once the connection is established, the remote UE stops monitoring the eNB DL, and relies on the SLSS of the selected relay node 305. The SLSS transmitted following establishment of the connection between the UE 311 and UE 305 is an example of a further measurement radio signal of which a characteristic (such as RSRP or RSRQ) is measureable by the UE 311 so as to allow the UE 311 to assess the continued suitability of the selected relay node 305. The continued SLSS transmission means that monitoring of the eNB DL by the UE 311 can be reduced, since RRM (radio resource management) measurement configuration can be changed on the basis of the monitored SLSS.

In an embodiment, once a connection is established between the UE 311 and a particular relay node 305, the data resources used for communication between the UE 311 and relay node 305 may reside within a different narrowband resource pool than the common resource pool. That is, such data resources may reside within a radio frequency band (relay-specific resource pool) associated with the selected relay node (as identified based on the measurement radio signal transmitted by that relay node) rather than the predetermined radio frequency band (common resource pool) within which the measurement radio signal of each potential relay node is originally sent. For example, in FIG. 5, if "Relay A" is selected, then the data resources reside within narrowband A, if "Relay B" is selected, then the data resources reside within narrowband B, and if "Relay C" is selected, then the data resources reside within narrowband C. As previously mentioned, the UE 311 may also use a relay-specific further measurement radio signal (such as SLSS) transmitted within that relay-specific narrowband. This further measurement radio signal may be transmitted in an on-demand manner (that is, the further measurement radio signal is transmitted on the relay-specific narrowband for a connected UE 311 and is not transmitted when there is no remote UE 311 connected).

It will thus be appreciated that from the above-mentioned paragraphs that, in general, the receiver 401 is configured to receive a further measurement radio signal from the determined relay node 305, the received further measurement radio signal being transmitted using the radio frequency band associated with the determined relay node. The controller 402 is configured to measure a characteristic of the received further measurement radio signal indicative of the suitability of the determined relay node for acting as a relay node for relaying a further radio signal between the terminal device 311 and the infrastructure equipment 301. If the controller 402 determines, based on the measured characteristic, that the determined relay node is no longer suitable for acting as a relay node for relaying a further radio signal between the terminal device 311 and the infrastructure equipment 301, then the controller 402 is configured to control the receiver 401 to switch to receiving radio signals transmitted using the predetermined radio frequency band (in order to measure the measurement radio signals of one or more other potential relay nodes, for example) or to receiving radio signals transmitted from infrastructure equipment 301 of the wireless telecommunications system using a different radio frequency band to the predetermined radio frequency band.

There are several possible approaches for the configuration of common and relay-specific resource pools, according to embodiments.

In one example, the eNB 301 broadcasts a configuration for the common resource pool, while resources for the relay-specific resource pools are provided using dedicated signalling either from the selected relay or from the eNB. This dedicated signalling may occur during or after PC5 connection establishment with the selected relay. Alternatively, this dedicated signalling may occur during or after a discovery procedure involving the selected relay, using signalling via the common resources. In this case latter case, the common resource pool contains not only the measurement radio signals of each potential relay node (such as SLSS of each potential relay node) but also data resources to be used for communication or discovery.

In another example, the eNB 301 broadcasts a configuration for each of the relay-specific resource pools. Authorisation to use those resources may be granted once a remote UE connects to a specific relay. In an example, there may be a predetermined relationship between the measurement radio signal of each relay node (for example, each relay node may incorporate a unique identifier into its respective measurement radio signal) and the specific resources that define the resource pool associated with that relay node. This predetermined relationship is broadcast to the UE 311 in advance by the eNB 301.

In an embodiment, once connected to a relay, and communicating using the relay specific resources, the remote UE 311 may continue to measure a characteristic of a further measurement radio signal transmitted by the selected relay 305 (for example, the UE 311 may measure an RSRP or RSRQ of a further measurement radio signal transmitted by the selected relay). In a case that the remote UE 311 detects poor or deteriorating radio quality, the UE 311 may then again perform the measurement of measurement radio signals of one or more potential alternative relays using the common resource pool in order to find a suitable alternative relay. Information indicative of the common resource pool (which may also be referred to as an anchor carrier) in which the measurement radio signals of the one or more potential alternative relays are transmitted can be provided to the UE 311 by eNB 301 or current relay UE 305, for example (the common resource pool may be the same as used during the initial selection of the current relay UE, or, alternatively, may have changed, thus requiring the UE 311 to be notified of the new common resource pool). The UE may also perform measurements of radio signals transmitted from the eNB 301 during this time.

In an embodiment, the rate of transmission of one or both of a measurement radio signal transmitted using the common resource pool and a further measurement radio signal transmitted using a relay-specific resource pool is adjustable. For example, while in good coverage (as measured, for example, when a RSRP or RSRQ of radio signals received from the eNB 301 is higher (for example, above a predetermined threshold)), a relay UE 305 may transmit its measurement radio signal/further measurement radio signal less frequently, since it is not time critical that a remote UE 311 connects via a relay 305 rather than directly to the eNB 301. However, at the edge of coverage, time becomes more critical, since the relay UE 305 may be providing an extension to coverage. Thus, while in worse coverage (as measured, for example, when a RSRP or RSRQ of radio signals received from the eNB 301 is lower (for example, below a predetermined threshold)), the relay UE 305 may transmit its measurement radio signal/further measurement radio signal more frequently. This helps to ensure that a potential remote device 311 can find an appropriate relay device 305 more quickly should it be reaching the edge of coverage.

It is noted that a remote UE 311 may be aware in advance of the specific narrowband for a particular relay. For example, this may be applicable in case that a relay UE 305 is a paired or associated device such as a smartphone with the same user as that of the remote UE 311 (which may be a wearable device, for example). This type of scenario may not require use of the common resource pool. On the other hand, if there are multiple potential relays (for example, if the wearable device may select any relay smartphone in a particular PLMN (public land mobile network)), then use of the common resource pool (as described) allows a suitable relay to be selected in an efficient manner. In an embodiment, the UE 311 may first attempt to find the last connected relay (by storing information indicative of the specific narrowband for that relay), before attempting the common resource pool. This may occur, for example, if a UE 311 has to temporarily establish a direct (that is, non-relayed) connection to the network (for example, to perform a voice call not supported via a relay) and returning to indirect (that is, relayed) communication mode.

In some examples, the common resource pool might contain the measurement radio signal (such as SLSS) only. In other examples, other signals such as discovery signals may also be configured in the common resource pool. In other examples, the UE 311 establishes a PC5 connection with a relay 305 using common resources, while only dedicated communication occurs in the non-common narrowband. In one example, PSBCH (Physical Sidelink Broadcast Channel) can also be transmitted in the common resource pool with the measurement radio signal (such as SLSS).

Figure 6:
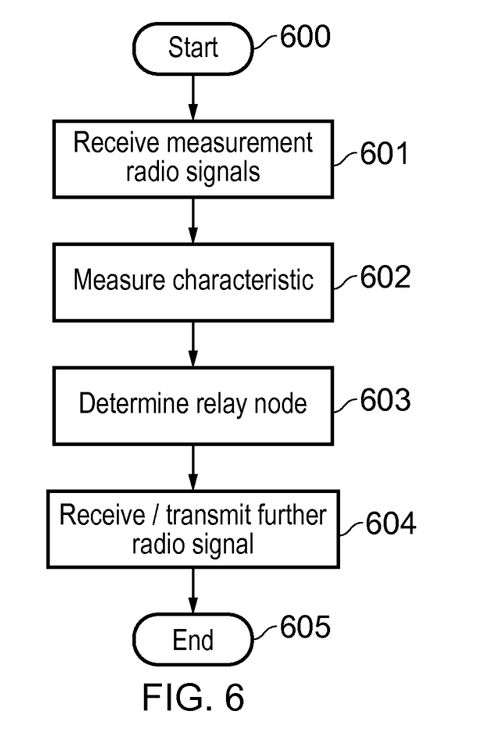
FIG. 6 illustrates a flow chart showing an example process carried out by a remote device.

FIG. 6 illustrates a flow chart showing a process carried out by a terminal device 311 (remote device) according to an embodiment. The process starts at step 600. At step 601, the receiver 401 is controlled to receive a measurement radio signal from each of one or more potential relay nodes of the wireless telecommunications system, each measurement radio signal being transmitted using the same predetermined radio frequency band and identifying the one of the potential relay nodes from which it is transmitted. At step 602, the controller 402 measures a characteristic of each received measurement radio signal indicative of the suitability of the potential relay node associated with that measurement radio signal for acting as a relay node for relaying a further radio signal between the terminal device 311 and infrastructure equipment 301 of the wireless telecommunications system. At step 603, the controller 402, based on each received measurement radio signal and its measured characteristic, determines a suitable one of the one or more potential relay nodes for acting as a relay node for relaying the further radio signal between the terminal device 311 and the infrastructure equipment 301. At step 604, the controller 402 controls one of the receiver 401 to receive the further radio signal from the infrastructure equipment via the determined relay node and the transmitter 400 to transmit the further radio signal to the infrastructure equipment via the determined relay node. In an embodiment, a PC5 connection is established between the terminal device 311 and the determined relay node 305 at step 604, for example. The process then ends at step 605.

Figure 7:
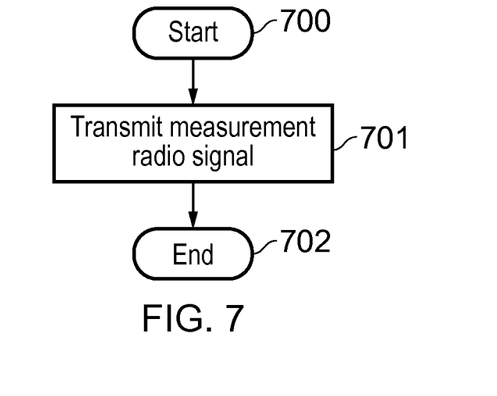
FIG. 7 illustrates a flow chart showing an example process carried out by a relay device.

FIG. 7 illustrates a flow chart showing a process carried out by a terminal device 305 (relay device) according to an embodiment. The process starts at step 700. At step 701, the transmitter 403 transmits a measurement radio signal to a further terminal device 311 of the wireless telecommunications system configured to use the terminal device 305 as a relay node for relaying a further radio signal between the further terminal device 311 and infrastructure equipment 301 of the wireless telecommunications system. The transmitted measurement radio signal identifies the terminal device 305, comprises a characteristic measurable by the further terminal device 311 and indicative of the suitability of the terminal device 305 for acting as a relay node for relaying a further radio signal between the further terminal device 311 and the infrastructure equipment 301, and is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted and comprising a characteristic measurable by the further terminal device 311 and indicative of the suitability of the one of the one or more further potential relay nodes from which it is transmitted for acting as a relay node for relaying a further radio signal between the further terminal device 311 and the infrastructure equipment 301. In an embodiment, this allows a PC5 connection to be subsequently established between the terminal device 305 and the further terminal device, for example. The process then ends at step 702.

Figure 8:
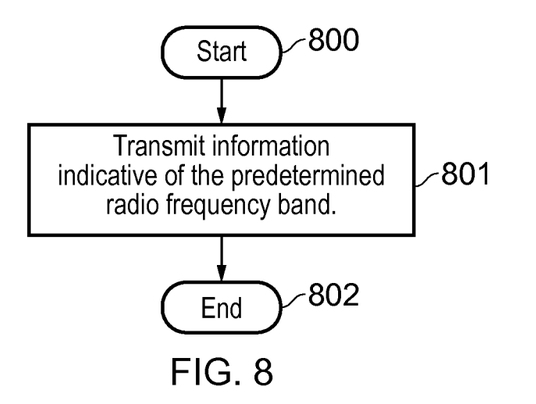
FIG. 8 illustrates a flow chart showing an example process carried out by infrastructure equipment.

FIG. 8 illustrates a flow chart showing a process carried out by infrastructure equipment 301 according to an embodiment. The infrastructure equipment is for use with a wireless telecommunications system comprising a first terminal device 311 (remote device) and one or more second terminal devices 305 (relay devices), the first terminal device being configured to receive a measurement radio signal from each of the one or more second terminal devices, each measurement radio signal being transmitted using the same predetermined radio frequency band and identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device. The process starts at step 800. At step 801, the transmitter 801 of the infrastructure equipment 301 is controlled (by the controller 407) to transmit a radio signal to the first terminal device 311 comprising information indicative of the predetermined radio frequency band. The process then ends at step 802.

It will be appreciated, from the above-mentioned description, that the present technique provides an efficient way to perform detection and measurement of multiple relay UEs, in particular with a bandwidth limited single receiver UE.

Although the above described embodiments of the present technique deal primarily with the relaying of downlink transmissions from an infrastructure equipment of a mobile communications network to a remote (communications) device, it should be clear to those reading that embodiments of the present technique may also include the relaying of signals on the uplink received by the relay device from a transmitting remote communications device and relayed to the infrastructure equipment, or the D2D relaying of signals between two communications devices.

Features of some embodiments of the present technique are defined by the following numbered clauses:

1. A terminal device for use with a wireless telecommunications system, the terminal device comprising:
   a transmitter;
   a receiver configured to receive a measurement radio signal from each of one or more potential relay nodes of the wireless telecommunications system, each measurement radio signal being transmitted using the same predetermined radio frequency band and identifying the one of the potential relay nodes from which it is transmitted; and
   a controller configured:
   to measure a characteristic of each received measurement radio signal indicative of the suitability of the potential relay node associated with that measurement radio signal for acting as a relay node for relaying a further radio signal between the terminal device and infrastructure equipment of the wireless telecommunications system, and
   based on each received measurement radio signal and its measured characteristic, to determine a suitable one of the one or more potential relay nodes for acting as a relay node for relaying the further radio signal between the terminal device and the infrastructure equipment, and to control one of the transmitter to transmit the further radio signal to the infrastructure equipment via the determined relay node and the receiver to receive the further radio signal from the infrastructure equipment via the determined relay node.

2. A terminal device according to clause 1, wherein the predetermined radio frequency band is a predetermined narrowband with a bandwidth defined by that of a predetermined number of physical resource blocks (PRBs) adjacent to each other in the frequency domain.

3. A terminal device according to clause 1 or 2, wherein the receiver is configured to receive radio signals transmitted over a bandwidth no greater than that of the predetermined radio frequency band.

4. A terminal device according to clause 3, wherein the receiver is configured to receive radio signals transmitted from infrastructure equipment of the wireless telecommunications system using a different radio frequency band to the predetermined radio frequency band and to periodically switch to receiving radio signals transmitted using the predetermined radio frequency band.

5. A terminal device according to clause 3 or 4, wherein the further radio signal transmitted to or received from the infrastructure equipment via the determined relay node is transmitted to or received from the determined relay node using a radio frequency band associated with the determined relay node, each of the plurality of potential relay nodes being associated with a respective radio frequency band for transmission of the further radio signal.

6. A terminal device according to clause 5, wherein:
the receiver is configured to receive a further measurement radio signal from the determined relay node, the received further measurement radio signal being transmitted using the radio frequency band associated with the determined relay node; and
the controller is configured to measure a characteristic of the received further measurement radio signal indicative of the suitability of the determined relay node for acting as a relay node for relaying a further radio signal between the terminal device and the infrastructure equipment, wherein
if the controller determines, based on the measured characteristic, that the determined relay node is no longer suitable for acting as a relay node for relaying a further radio signal between the terminal device and the infrastructure equipment, the controller is configured to control the receiver to switch to receiving radio signals transmitted using the predetermined radio frequency band or to receiving radio signals transmitted from infrastructure equipment of the wireless telecommunications system using a different radio frequency band to the predetermined radio frequency band.

7. A terminal device according to any preceding clause, wherein the measurement radio signals transmitted from the one or more potential relay nodes are each transmitted at a different respective time.

8. A terminal device according to any preceding clause, wherein the measurement radio signals transmitted from the one or more potential relay nodes are each encoded using a different respective code.

9. A terminal device according to any preceding clause, wherein the measurement radio signals transmitted from the one or more potential relay nodes are each transmitted using a different respective frequency sub-band of the predetermined radio frequency band.

10. A terminal device for use as a relay node in a wireless telecommunications system, the terminal device comprising a transmitter configured to transmit a measurement radio signal to a further terminal device of the wireless telecommunications system configured to use the terminal device as a relay node for relaying a further radio signal between the further terminal device and infrastructure equipment of the wireless telecommunications system, wherein the transmitted measurement radio signal:
identifies the terminal device;
comprises a characteristic measurable by the further terminal device and indicative of the suitability of the terminal device for acting as a relay node for relaying a further radio signal between the further terminal device and the infrastructure equipment; and
is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted and comprising a characteristic measurable by the further terminal device and indicative of the suitability of the one of the one or more further potential relay nodes from which it is transmitted for acting as a relay node for relaying a further radio signal between the further terminal device and the infrastructure equipment.

11. A terminal device according to clause 10, wherein the predetermined radio frequency band is a predetermined narrowband with a bandwidth defined by that of a predetermined number of physical resource blocks (PRBs) adjacent to each other in the frequency domain.

12. A terminal device according to clause 10 or 11, wherein the further terminal device is configured to receive radio signals transmitted over a bandwidth no greater than that of the predetermined radio frequency band.

13. A terminal device according to clause 12, the terminal device comprising a receiver, wherein one of the transmitter is configured to transmit the further radio signal to the further terminal device and the receiver is configured to receive the further radio signal from the further terminal device using a radio frequency band associated with the terminal device, each of the terminal device and one or more further potential relay nodes being associated with a respective radio frequency band for transmission of the further radio signal.

14. A terminal device according to clause 13, wherein the transmitter is configured to transmit a further measurement radio signal to the further terminal device, the transmitted further measurement radio signal being transmitted using the radio frequency band associated with the terminal device and comprising a characteristic measurable by the further terminal device and indicative of the suitability of the terminal device for acting as a relay node for relaying a further radio signal between the further terminal device and the infrastructure equipment.

15. A terminal device according to clause 14, wherein the transmitter is configured to transmit the further measurement radio signal more frequently at a first time at which a strength or quality of radio signals transmitted by the infrastructure equipment is lower and less frequently at a second time at which the strength or quality of radio signals transmitted by the infrastructure equipment is higher.

16. A terminal device according to any one of clauses 10 to 15, wherein the transmitter is configured to transmit the measurement radio signal more frequently at a first time at which a strength or quality of radio signals transmitted by the infrastructure equipment is lower and less frequently at a second time at which the strength or quality of radio signals transmitted by the infrastructure equipment is higher.

17. A terminal device according to any one of clauses 10 to 16, wherein the measurement radio signals transmitted by the terminal device and the one or more further potential relay nodes are each transmitted at a different respective time.

18. A terminal device according to any one of clauses 10 to 17, wherein the measurement radio signals transmitted by the terminal device and the one or more further potential relay nodes are each encoded using a different respective code.

19. A terminal device according to any one of clauses 10 to 18, wherein the measurement radio signals transmitted by the terminal device and the one or more further potential relay nodes are each transmitted using a different respective frequency sub-band of the predetermined radio frequency band.

20. Infrastructure equipment for use with a wireless telecommunications system comprising a first terminal device and one or more second terminal devices, the first terminal device being configured to receive a measurement radio signal from each of the one or more second terminal devices, each measurement radio signal being transmitted using the same predetermined radio frequency band and identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device, the infrastructure equipment comprising a transmitter configured to transmit a radio signal to the first terminal device comprising information indicative of the predetermined radio frequency band.

21. Infrastructure equipment according to clause 20, wherein the further radio signal transmitted to or received from the first terminal device via the determined second terminal device is transmitted to or received from the determined second radio terminal device using a radio frequency band associated with the determined second terminal device, each of the one or more second terminal device relay nodes being associated with a respective radio frequency band for transmission of the further radio signal, wherein the transmitter of the infrastructure equipment is configured to transmit a radio signal to each of the one or more second terminal devices comprising information indicative of the radio frequency band associated with that second terminal device for transmission of the further radio signal.

22. A method of operating a terminal device for use with a wireless telecommunications system, the method comprising:
controlling a receiver of the terminal device to receive a measurement radio signal from each of one or more potential relay nodes of the wireless telecommunications system, each measurement radio signal being transmitted using the same predetermined radio frequency band and identifying the one of the potential relay nodes from which it is transmitted;
measuring a characteristic of each received measurement radio signal indicative of the suitability of the potential relay node associated with that measurement radio signal for acting as a relay node for relaying a further radio signal between the terminal device and infrastructure equipment of the wireless telecommunications system, and
based on each received measurement radio signal and its measured characteristic, determining a suitable one of the one or more potential relay nodes for acting as a relay node for relaying the further radio signal between the terminal device and the infrastructure equipment; and
controlling one of the receiver of the terminal device to receive the further radio signal from the infrastructure equipment via the determined relay node and a transmitter of the terminal device to transmit the further radio signal to the infrastructure equipment via the determined relay node.

23. A method of operating a terminal device for use as a relay node in a wireless telecommunications system, the method comprising controlling a transmitter of the terminal device to transmit a measurement radio signal to a further terminal device of the wireless telecommunications system configured to use the terminal device as a relay node for relaying a further radio signal between the further terminal device and infrastructure equipment of the wireless telecommunications system, wherein the transmitted measurement radio signal:
identifies the terminal device;
comprises a characteristic measurable by the further terminal device and indicative of the suitability of the terminal device for acting as a relay node for relaying a further radio signal between the further terminal device and the infrastructure equipment; and
is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted and comprising a characteristic measurable by the further terminal device and indicative of the suitability of the one of the one or more further potential relay nodes from which it is transmitted for acting as a relay node for relaying a further radio signal between the further terminal device and the infrastructure equipment.

24. A method of operating infrastructure equipment for use with a wireless telecommunications system comprising a first terminal device and one or more second terminal devices, the first terminal device being configured to receive a measurement radio signal from each of the one or more second terminal devices, each measurement radio signal being transmitted using the same predetermined radio frequency band and identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device, the method comprising controlling a transmitter of the infrastructure equipment to transmit a radio signal to the first terminal device comprising information indicative of the predetermined radio frequency band.

25. A wireless telecommunications system comprising a terminal device according to clause 1 and a terminal device according to clause 10.

26. A wireless telecommunications system according to clause 25, further comprising infrastructure equipment according to clause 20.

27. Circuitry for a terminal device for use with a wireless telecommunications system, the circuitry comprising transmitter circuitry, receiver circuitry and controller circuitry, wherein the controller circuitry is configured:

to control the receiver circuitry to receive a measurement radio signal from each of one or more potential relay nodes of the wireless telecommunications system, each measurement radio signal being transmitted using the same predetermined radio frequency band and identifying the one of the potential relay nodes from which it is transmitted;

to measure a characteristic of each received measurement radio signal indicative of the suitability of the potential relay node associated with that measurement radio signal for acting as a relay node for relaying a further radio signal between the terminal device and infrastructure equipment of the wireless telecommunications system, and based on each received measurement radio signal and its measured characteristic, to determine a suitable one of the one or more potential relay nodes for acting as a relay node for relaying the further radio signal between the terminal device and the infrastructure equipment; and to control one of the receiver circuitry to receive the further radio signal from the infrastructure equipment via the determined relay node and the transmitter circuitry to transmit the further radio signal to the infrastructure equipment via the determined relay node.

28. Circuitry for a terminal device for use as a relay node in a wireless telecommunications system, the circuitry comprising transmitter circuitry, receiver circuitry and controller circuitry, wherein the controller circuitry is configured to control the transmitter circuitry to transmit a measurement radio signal to a further terminal device of the wireless telecommunications system configured to use the terminal device as a relay node for relaying a further radio signal between the further terminal device and infrastructure equipment of the wireless telecommunications system, wherein the transmitted measurement radio signal:

identifies the terminal device;

comprises a characteristic measurable by the further terminal device and indicative of the suitability of the terminal device for acting as a relay node for relaying a further radio signal between the further terminal device and the infrastructure equipment; and is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted and comprising a characteristic measurable by the further terminal device and indicative of the suitability of the one of the one or more further potential relay nodes from which it is transmitted for acting as a relay node for relaying a further radio signal between the further terminal device and the infrastructure equipment.

29. Circuitry for infrastructure equipment for use with a wireless telecommunications system comprising a first terminal device and one or more second terminal devices, the first terminal device being configured to receive a measurement radio signal from each of the one or more second terminal devices, each measurement radio signal being transmitted using the same predetermined radio frequency band and identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device, wherein the circuitry comprises transmitter circuitry, receiver circuitry and controller circuitry, the controller circuitry being configured to control the transmitter circuitry to transmit a radio signal to the first terminal device comprising information indicative of the predetermined radio frequency band.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.
[4] RP-161839, "Revised SI: Further Enhancements LTE Device to Device, UE to Network Relays for IoT and Wearables", Huawei et al, RAN #73

The invention claimed is:

1. A terminal device for use with a wireless telecommunications system, the terminal device comprising:
   a transmitter;
   a receiver configured to receive a measurement radio signal from each of one or more potential relay nodes of the wireless telecommunications system, each measurement radio signal being transmitted using the same predetermined radio frequency band, and each measurement radio signal identifying the one of the potential relay nodes from which it is transmitted; and
   a controller configured:
   to measure a characteristic of each received measurement radio signal indicative of the suitability of the potential relay node associated with that measurement radio signal for acting as a relay node for relaying a further radio signal between the terminal device and infrastructure equipment of the wireless telecommunications system, and
   based on each received measurement radio signal and its measured characteristic, to determine a suitable one of the one or more potential relay nodes for acting as a relay node for relaying the further radio signal between the terminal device and the infrastructure equipment, and to control one of the transmitter to transmit the further radio signal to the infrastructure equipment via the determined relay node and the receiver to receive the further radio signal from the infrastructure equipment via the determined relay node, wherein the predetermined radio frequency band is a predetermined narrowband with a bandwidth defined by that of a predetermined number of physical resource blocks (PRBs) adjacent to each other in the frequency domain, the predetermined narrowband being only for the transmission of one or more of: the measurement radio signals, discovery signals, and establishment of a connection between the terminal device and one of the potential relay nodes.

2. A terminal device according to claim 1, wherein the receiver is configured to receive radio signals transmitted over a bandwidth no greater than that of the predetermined radio frequency band.

3. A terminal device according to claim 1, wherein the measurement radio signals transmitted from the one or more potential relay nodes are each transmitted at a different respective time.

4. A terminal device for use as a relay node in a wireless telecommunications system, the terminal device comprising a transmitter configured to transmit a measurement radio signal to a further terminal device of the wireless telecommunications system configured to use the terminal device as a relay node for relaying a further radio signal between the further terminal device and infrastructure equipment of the wireless telecommunications system, wherein the transmitted measurement radio signal:
   identifies the terminal device;
   comprises a characteristic measurable by the further terminal device and indicative of the suitability of the terminal device for acting as a relay node for relaying a further radio signal between the further terminal device and the infrastructure equipment; and
   is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted, and each of these measurement radio signals comprising a characteristic measurable by the further terminal device and indicative of the suitability of the one or more further potential relay nodes from which it is transmitted for acting as a relay node for relaying a further radio signal between the further terminal device and the infrastructure equipment, wherein the predetermined radio frequency band is a predetermined narrowband with a bandwidth defined by that of a predetermined number of physical resource blocks (PRBs) adjacent to each other in the frequency domain, the predetermined narrowband being only for the transmission of one or more of: the measurement radio signals, discovery signals, and establishment of a connection between the terminal device and one of the potential relay nodes.

5. A terminal device according to claim 4, wherein the further terminal device is configured to receive radio signals transmitted over a bandwidth no greater than that of the predetermined radio frequency band.

6. A terminal device according to claim 5, the terminal device comprising a receiver, wherein the transmitter is configured to transmit the further radio signal to the further terminal device and the receiver is configured to receive the further radio signal from the further terminal device using a radio frequency band associated with the terminal device, each of the terminal device and one or more further potential relay nodes being associated with a respective radio frequency band for transmission of the further radio signal.

7. A terminal device according to claim 6, wherein the transmitter is configured to transmit a further measurement radio signal to the further terminal device, the transmitted further measurement radio signal being transmitted using the radio frequency band associated with the terminal device and comprising a characteristic measurable by the further terminal device and indicative of the suitability of the terminal device for acting as a relay node for relaying a further radio signal between the further terminal device and the infrastructure equipment.

8. A terminal device according to claim 7, wherein the transmitter is configured to transmit the further measurement radio signal more frequently at a first time at which a strength or quality of radio signals transmitted by the infrastructure equipment is lower and less frequently at a second time at which the strength or quality of radio signals transmitted by the infrastructure equipment is higher.

9. Infrastructure equipment for use with a wireless telecommunications system comprising a first terminal device and one or more second terminal devices, the first terminal device being configured to receive a measurement radio signal from each of the one or more second terminal devices, each measurement radio signal being transmitted using the same predetermined radio frequency band, and each measurement radio signal identifying the one of the second terminal devices from which it is transmitted, to measure a characteristic of each received measurement radio signal indicative of the suitability of the second terminal device associated with that measurement radio signal for acting as a relay node for relaying a further radio signal between the first terminal device and the infrastructure equipment, and, based on each received measurement radio signal and its measured characteristic, to determine a suitable one of the one or more second terminal devices for acting as a relay node for relaying the further radio signal between the first terminal device and the infrastructure equipment, and to one of transmit the further radio signal to the infrastructure equipment via the determined second terminal device and receive the further radio signal from the infrastructure equipment via the determined second terminal device, the infrastructure equipment comprising a transmitter configured to transmit a radio signal to the first terminal device comprising information indicative of the predetermined radio frequency band, wherein the predetermined radio frequency band is a predetermined narrowband with a bandwidth defined by that of a predetermined number of physical resource blocks (PRBs) adjacent to each other in the frequency domain, the predetermined narrowband being only for the transmission of one or more of: the measurement radio signals, discovery signals, and establishment of a connection between the terminal device and one of the potential relay nodes.

10. Circuitry for a terminal device for use as a relay node in a wireless telecommunications system, the circuitry comprising transmitter circuitry, receiver circuitry and controller circuitry, wherein the controller circuitry is configured to control the transmitter circuitry to transmit a measurement radio signal to a further terminal device of the wireless telecommunications system configured to use the terminal device as a relay node for relaying a further radio signal between the further terminal device and infrastructure equipment of the wireless telecommunications system, wherein the transmitted measurement radio signal:

identifies the terminal device;

comprises a characteristic measurable by the further terminal device and indicative of the suitability of the terminal device for acting as a relay node for relaying a further radio signal between the further terminal device and the infrastructure equipment; and is transmitted using the same predetermined radio frequency band as usable for transmission of a measurement radio signal by one or more further potential relay nodes of the wireless telecommunications system, each of these measurement radio signals identifying the one of the one or more further potential relay nodes from which it is transmitted, and each of these measurement radio signals comprising a characteristic measurable by the further terminal device and indicative of the suitability of the one of the one or more further potential relay nodes from which it is transmitted for acting as a relay node for relaying a further radio signal between the further terminal device and the infrastructure equipment, wherein the predetermined radio frequency band is a predetermined narrowband with a bandwidth defined by that of a predetermined number of physical resource blocks (PRBs) adjacent to each other in the frequency domain, the predetermined narrowband being only for the transmission of one or more of: the measurement radio signals, discovery signals, and establishment of a connection between the terminal device and one of the potential relay nodes.

* * * * *